(12) United States Patent
Tomoeda et al.

(10) Patent No.: US 11,431,706 B2
(45) Date of Patent: Aug. 30, 2022

(54) COMMUNICATION CONTROL SYSTEM AND COMMUNICATION CONTROL DEVICE (71) Applicants: Kabushiki Kaisha Toshiba, Minato-ku (JP); Toshiba Infrastructure Systems & Solutions Corporation, Kawasaki (JP)

(72) Inventors: Yuuki Tomoeda, Yokohama (JP); Kei Sugibuchi, Kawasaki (JP); Hiroki Fukuoka, Yokohama (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 183 days.

(21) Appl. No.: 16/642,736

(22) PCT Filed: Aug. 28, 2018

(86) PCT No.: PCT/JP2018/031706
§ 371 (c)(1),
(2) Date: Feb. 27, 2020

(87) PCT Pub. No.: WO2019/049724
PCT Pub. Date: Mar. 14, 2019

(65) Prior Publication Data
US 2020/0204549 A1 Jun. 25, 2020

(30) Foreign Application Priority Data
Sep. 8, 2017 (JP) .............................. JP2017-173182

(51) Int. Cl.
*H04L 9/40* (2022.01)
*G06F 21/44* (2013.01)
(Continued)

(52) U.S. Cl.
CPC ........ *H04L 63/0869* (2013.01); *G06F 21/445* (2013.01); *H04L 9/0819* (2013.01);
(Continued)

(58) Field of Classification Search
CPC . H04L 63/0869; H04L 9/0819; H04L 9/3268; H04L 63/0435; H04L 63/0823;
(Continued)

(56) References Cited

U.S. PATENT DOCUMENTS 9,178,706 B1 11/2015 Bollay et al.
2002/0026574 A1 * 2/2002 Watanabe ............... G06F 21/10
380/278
(Continued)

FOREIGN PATENT DOCUMENTS

CN 101227452 A 7/2008
CN 102348210 A 2/2012
(Continued)

OTHER PUBLICATIONS

Extended European Search Report dated Mar. 30, 2021 in European Patent Application No. 18853112.3, 9 pages.
(Continued)

*Primary Examiner* — Techane Gergiso
(74) *Attorney, Agent, or Firm* — Oblon, McClelland, Maier & Neustadt, L.L.P.

(57) ABSTRACT

A communication control system includes a first communication control device and a second signal processing device. The first communication control device is connected to a client terminal device and a network communication grid. The second communication control device is connected to a server terminal device and the network communication grid.

15 Claims, 5 Drawing Sheets (51) Int. Cl.
  *H04L 9/08*   (2006.01)
  *H04L 9/32*   (2006.01)
(52) U.S. Cl.
  CPC ........ *H04L 9/3268* (2013.01); *H04L 63/0435*
        (2013.01); *H04L 63/0823* (2013.01)
(58) Field of Classification Search
  CPC ......... H04L 9/08; H04L 29/06; H04L 9/3263;
        H04L 63/0471; H04L 63/0853; H04L
        63/168; H04L 9/32; G06F 21/445; G06F
        21/44
  See application file for complete search history.

(56)             References Cited

U.S. PATENT DOCUMENTS

| 2002/0062440 | A1* | 5/2002  | Akama    | H04L 63/12  |
|              |     |         |          | 713/171     |
| 2004/0006695 | A1* | 1/2004  | Ishibashi | H04L 9/3273 |
|              |     |         |          | 713/176     |
| 2005/0033957 | A1  | 2/2005  | Enokida  |             |
| 2005/0154877 | A1* | 7/2005  | Trench   | H04L 9/3265 |
|              |     |         |          | 713/156     |
| 2006/0112272 | A1  | 5/2006  | Morioka et al. | |
| 2006/0200681 | A1  | 9/2006  | Kato et al. | |
| 2006/0294367 | A1  | 12/2006 | Yoshioka | |
| 2009/0132808 | A1  | 5/2009  | Baentsch et al. | |
| 2010/0175061 | A1* | 7/2010  | Maeda    | G06F 8/65   |
|              |     |         |          | 717/173     |
| 2011/0231649 | A1  | 9/2011  | Bollay et al. | |
| 2011/0231651 | A1  | 9/2011  | Bollay   | |
| 2011/0231652 | A1  | 9/2011  | Bollay et al. | |
| 2011/0231653 | A1  | 9/2011  | Bollay et al. | |
| 2011/0231655 | A1  | 9/2011  | Bollay et al. | |
| 2011/0231923 | A1  | 9/2011  | Bollay et al. | |
| 2016/0072811 | A1  | 3/2016  | Bollay et al. | |
| 2016/0080328 | A1  | 3/2016  | Bollay et al. | |
| 2017/0142100 | A1  | 5/2017  | Bollay et al. | |
| 2017/0237716 | A1  | 8/2017  | Kim et al. | |
| 2020/0204549 | A1  | 6/2020  | Tomoeda et al. | |

FOREIGN PATENT DOCUMENTS

| JP | 2001-251297   | A  | 9/2001  |
| JP | 2004-194295   | A  | 7/2004  |
| JP | 2004-320751   | A  | 11/2004 |
| JP | 2004-350267   | A  | 12/2004 |
| JP | 2005-39790    | A  | 2/2005  |
| JP | 2005-235159   | A  | 9/2005  |
| JP | 2008-197963   | A  | 8/2008  |
| JP | 2009-117887   | A  | 5/2009  |
| JP | 4601706       | B2 | 12/2010 |
| JP | 2011-507054   | A  | 3/2011  |
| JP | 4750750       | B2 | 8/2011  |
| JP | 4843903       | B2 | 12/2011 |
| JP | 2016-136664   | A  | 7/2016  |
| JP | 2019-50485    | A  | 3/2019  |
| WO | WO 02/067532  | A1 | 8/2002  |

OTHER PUBLICATIONS

International Search Report dated Nov. 13, 2018 in PCT/JP2018/031706 filed on Aug. 28, 2018, 2 pages.
Japanese Office Action dated Oct. 1, 2019 in Japanese Patent Application No. 2017-173182 filed on Sep. 8, 2017 (with unedited computer generated English translation), 12 pages.
Shigemitsu et al., "Encryption System for Facsimile Transmissions," IEICE Technical Report, vol. 89, No. 458, pp. 1-8, Mar. 16, 1990 (total 12 pages).

* cited by examiner

COMMUNICATION CONTROL SYSTEM AND COMMUNICATION CONTROL DEVICE

TECHNICAL FIELD

Embodiments of the present invention relate to a communication control system and a communication control device.

BACKGROUND ART

In social infrastructure systems such as monitoring cameras, the control of equipment and data to be handled may need to be protected from an attack of malware or the like. However, it is difficult to frequently replace equipment constituting a social infrastructure system. Thus, there is a problem in that security measures may become insufficient.

CITATION LIST

Patent Literature

[Patent Literature 1]
Japanese Unexamined Patent Application, First Publication No. 2009-117887

SUMMARY OF INVENTION

Technical Problem

The problem to be solved by the present invention is to provide a communication control system and a communication control device capable of improving the security of a social infrastructure system without changing the social infrastructure system.

Solution to Problem

A communication control system of an embodiment includes a first communication control device and a second communication control device. The first communication control device is connected to a client device and a network communication grid. The second communication control device is connected to a server device and the network communication grid. The first communication control device includes a first authentication unit and a first control unit. The first control unit requests the first authentication unit to perform at least one of a first mutual authentication process of performing mutual authentication using a secret key and a client certificate issued by a private authentication authority in communication with the second communication control device and a first encryption/decryption process of encrypting information to be transmitted to the server device by the client device using a common key determined in the mutual authentication process and decrypting the information transmitted to the client device by the server device, transmits the encrypted information to the second communication control device when the first authentication unit has been requested to perform the first encryption/decryption process, and transmits the decrypted information to the client device. The second communication control device includes a second authentication unit and a second control unit. The second control unit requests the second authentication unit to perform at least one of a second mutual authentication process of performing mutual authentication using a secret key and a server certificate issued by the private authentication authority in communication with the first communication control device and a second encryption/decryption process of encrypting information to be transmitted to the client device by the server device using a common key determined in the mutual authentication process and decrypting the information transmitted to the server device by the client device, transmits the encrypted information to the first communication control device when the second authentication unit has been requested to perform the second encryption/decryption process, and transmits the decrypted information to the server device.

DESCRIPTION OF EMBODIMENTS

Hereinafter, a communication control system and a communication control device according to embodiments will be described with reference to the drawings.

Figure 1:
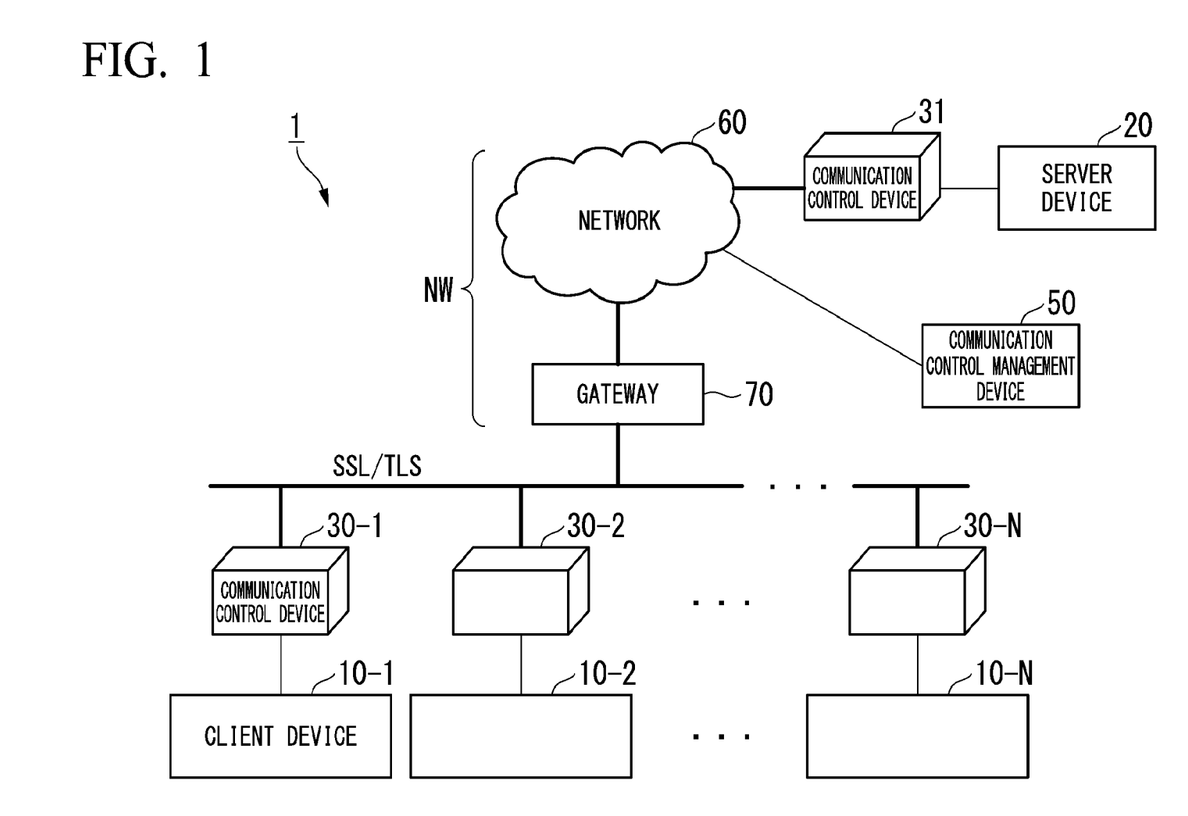
FIG. 1 is a diagram showing an example of a configuration of a communication control system 1 according to an embodiment.

FIG. 1 is a diagram showing an example of a configuration of a communication control system 1 according to an embodiment. The communication control system 1 includes client devices 10 (10-1 to 10-N), a server device 20, and client-side communication control devices 30 (30-1 to 30-N) (an example of a "first communication control device"), a server-side communication control device 31 (an example of a "first communication control device"), a communication control management device 50 (an example of a "private certificate authority"), a network 60, and a gateway 70. In the following description, the network 60 and the gateway 70 that connects the network 60 and the client device 10 and the like are collectively referred to as "networks NW".

The client device 10 is connected to the network NW via the client-side communication control device 30. The server device 20 is connected to the network NW via the server-side communication control device 31. Details of the configurations of the client device 10 and the server device 20 will be described below.

The client-side communication control device 30 is connected to the client device 10 and the network NW and mediates communication between the client device 10 and the server device 20. The client-side communication control device 30 acquires data transmitted by the client device 10 to the server device 20 and outputs the acquired data to the server device 20. Here, when data is transmitted to the server device 20, the client-side communication control device 30 encrypts data acquired from the client device 10 and transmits the encrypted data to the server device 20.

The client-side communication control device 30 acquires data transmitted by the server device 20 to the client device 10 and outputs the acquired data to the client device 10. Here, the data acquired by the client-side communication control device 30 is encrypted data. When data is output to the client device 10, the client-side communication control device 30 decrypts the data acquired from the server device 20 via the server-side communication control device 31 and outputs the decrypted data to the client device 10.

The server-side communication control device 31 is connected to the server device 20 and the network NW and mediates communication between the client device 10 and the server device 20. The server-side communication control device 31 acquires data transmitted by the server device 20 to the client device 10 and transmits the acquired data to the client device 10. Here, when data is transmitted to the client device 10, the server-side communication control device 31 encrypts the data acquired from the server device 20 and transmits the encrypted data to the client device 10.

The server-side communication control device 31 acquires data transmitted by the client device 10 to the server device 20 and outputs the acquired data to the server device 20. Here, the data acquired by the server-side communication control device 31 is encrypted data. When data is output to the server device 20, the server-side communication control device 31 decrypts the data acquired from the client device 10 via the client-side communication control device 30 and outputs the decrypted data to the server device 20.

In the present embodiment, in the data encryption performed by the client-side communication control device 30 and the server-side communication control device 31, encryption based on, for example, a secure socket layer (SSL)/transport layer security (TLS) protocol, is performed. For example, the client-side communication control device 30 and the server-side communication control device 31 combine the SSL/TLS protocol with an HTTP to encrypt data included in the HTTP and to replace the encrypted data with that of HTTP secure (HTTPS) in which security is improved.

The data encryption performed by the client-side communication control device 30 and the server-side communication control device 31 is not limited to a change of the HTTP data to the HTTPS data. The client-side communication control device 30 and the server-side communication control device 31 may replace the SSL/TLS protocol with a secure communication protocol for improving security by combining the SSL/TLS protocol with various communication protocols. For example, the client-side communication control device 30 and the server-side communication control device 31 may replace a file transfer protocol (FTP) with FTP secure (FTPS).

In the present embodiment, the data encrypted by the client-side communication control device 30 or the server-side communication control device 31 is output to the network NW. In other words, in the present embodiment, data flowing through the network NW is encrypted data. Thus, it is possible to avoid a risk that data transmitted/received through the network NW is maliciously accessed from the outside and the data is intercepted and to improve security. The term "data interception" here means an "act of stealing a glance at data" or an "act of extracting data".

The communication control management device 50 issues a client certificate and a secret key to the client-side communication control device 30. For example, the communication control management device 50 issues an IC card storing the client certificate and the secret key. The communication control management device 50 transmits the client certificate and the secret key to be stored in the IC card to the client-side communication control device 30 to which the IC card is attached via the network NW.

The communication control management device 50 issues the server certificate and the secret key to the server-side communication control device 31. For example, the communication control management device 50 issues an IC card storing the server certificate and the secret key. The communication control management device 50 transmits the server certificate and the secret key to be stored in the IC card to the server-side communication control device 31 to which the IC card is attached via the network NW. Each of the client certificate, the server certificate, and the secret key is information required to determine a common key (a session key) used when the client-side communication control device 30 and the server-side communication control device 31 perform encrypted communication.

Here, the configurations of the client device 10 and the server device 20 will be described. The client device 10 and the server device 20 are components that constitute a social infrastructure system. For example, the social infrastructure is a facility necessary for providing a social base such as a road traffic network, a power generation facility, a power distribution facility, a water treatment facility, or a gas distribution facility. The social infrastructure system is, for example, a mechanism for stably operating the social infrastructure by monitoring the social infrastructure, ascertaining a change in the situation, and coping with the change. In the following, an example in which the client device 10 and the server device are components of a monitoring system that monitors roads and public facilities will be described. In this case, the client device 10 is a device that transmits imaging data obtained by imaging a road condition or the like via the network NW (a network monitoring camera). The server device 20 is a device that receives the imaging data transmitted by the client device 10 via the network NW.

The client device 10 and the server device 20 are not limited to the components of the monitoring system. For example, the client device 10 and the server device may be components of a system that monitors a power situation in the power generation facility or the power distribution facility or components of a system that acquires a distribution situation in a logistics center, a system that acquires an operation situation of a facility in a factory or research institution, or the like.

Figure 2:
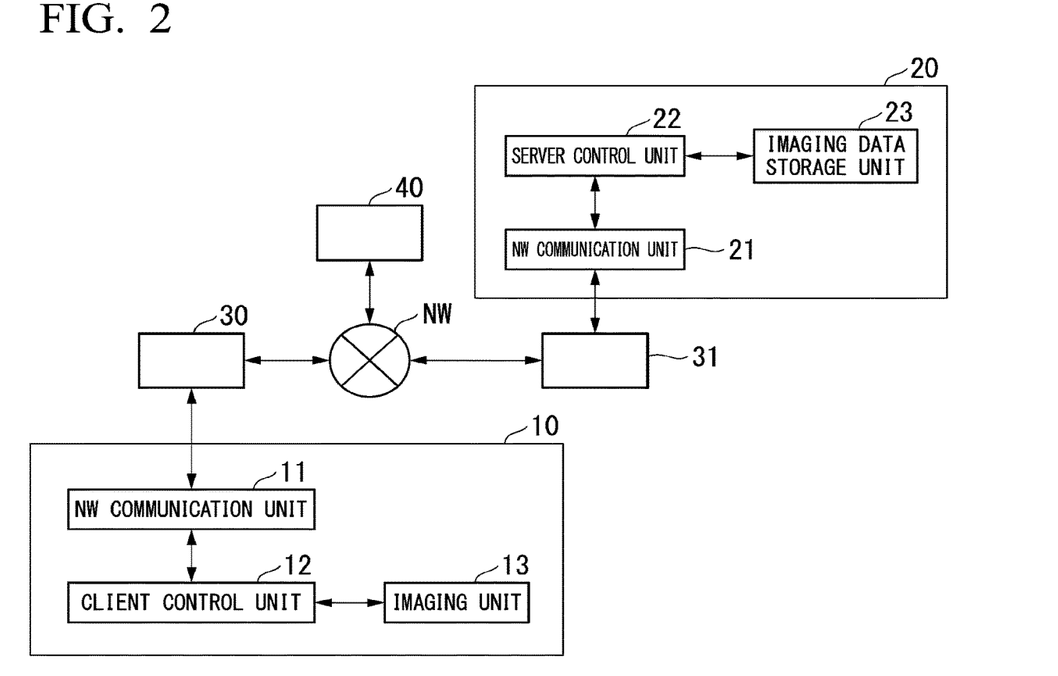
FIG. 2 is a block diagram showing an example of functional configurations of a client device 10 and a server device 20 according to the embodiment.

FIG. 2 is a block diagram showing an example of functional configurations of the client device 10 and the server device 20 according to the embodiment.

The client device 10 includes a network (NW) communication unit 11, a client control unit 12, and an imaging unit 13. The NW communication unit 11 is, for example, an Ethernet (registered trademark) port of the client device 10. In the present embodiment, the NW communication unit 11 is connected to the client-side communication control device 30 and outputs data transmitted from the client device 10 to the server device 20 to the client-side communication control device 30. If the NW communication unit 11 is a conventional system, the NW communication unit 11 is connected to the network NW and corresponds to a functional unit that communicates with the server device 20 via the network NW.

For example, the client control unit 12 is a processor including a CPU and the like and generally controls the client device 10. For example, the client control unit 12 causes the imaging unit 13 to start or stop imaging or sets imaging conditions such as a direction of the camera that performs imaging with respect to the imaging unit 13 and a magnification at the time of imaging in accordance with control from the server device 20.

The imaging unit 13 images a landscape at a predetermined location in accordance with an instruction from the client control unit 12. The imaging unit 13 outputs data obtained through imaging (imaging data) to the client control unit 12.

The server device 20 includes a network (NW) communication unit 21, a server control unit 22, and an imaging data storage unit 23. The NW communication unit 21 is, for example, an Ethernet (registered trademark) port of the server device 20. In the present embodiment, the NW communication unit 21 is connected to the server-side communication control device 31 and outputs data to be transmitted from the server device 20 to the client device 10 to the server-side communication control device 31. In the case of a conventional system, the NW communication unit 21 is connected to the network NW and corresponds to a functional unit that communicates with the client device 10 via the network NW.

For example, the server control unit 22 is a processor including a CPU and the like and generally controls the server device 20. For example, the server control unit 22 causes the imaging data storage unit 23 to store imaging data obtained through imaging performed by the client device 10. The imaging data storage unit 23 stores the imaging data in accordance with an instruction of the server control unit 22.

In the conventional system, when the client device 10 and the server device 20 are connected to each other via the NW communication unit and the network NW, an HTTP, which is a general communication protocol in a network monitoring camera, is used in the communication between the client device and the server device 20.

In this case, unencrypted information (so-called plaintext) output to the network NW by the client device 10 or the server device 20 flows through the network NW. In this case, if data on the network NW is acquired maliciously from the outside, there is a risk that imaging data can be easily intercepted or tampered with. As a countermeasure against such an unauthorized attack, a case in which the client device 10 encrypts the imaging data and outputs the encrypted imaging data to the network NW is conceivable. For example, the client control unit 12 of the client device 10 encrypts the imaging data and outputs the encrypted imaging data to the network NW. However, because a processor such as a CPU already provided in the monitoring camera is generally used for the purpose of compressing or encoding imaging data, a resource for performing an encryption process is not further provided. In this case, the CPU originally provided in the client control unit 12 cannot encrypt imaging data. When the client control unit 12 causes the imaging data to be encrypted, a case in which it is necessary to change or replace the hardware configuration of the client control unit 12 such that the client control unit 12 is further equipped with a processor for encrypting the imaging data is conceivable. However, because the client device 10 is a component that constitutes a social infrastructure such as a monitoring camera, the hardware configuration cannot be easily changed or replaced. In view of such circumstances, it is desirable that imaging data be encrypted and output to the network NW without changing the client device 10.

In the present embodiment, the client-side communication control device 30 connected to the client device 10 and the network NW encrypts the data transmitted by the client device 10 and outputs the encrypted data to the network NW. The server-side communication control device 31 connected to the server device 20 and the network NW encrypts the control data transmitted by the server device 20 and outputs the encrypted control data to the network NW. Thereby, the security of the imaging data flowing through the network NW is improved without changing the client device 10 and the server device 20.

Figure 3:
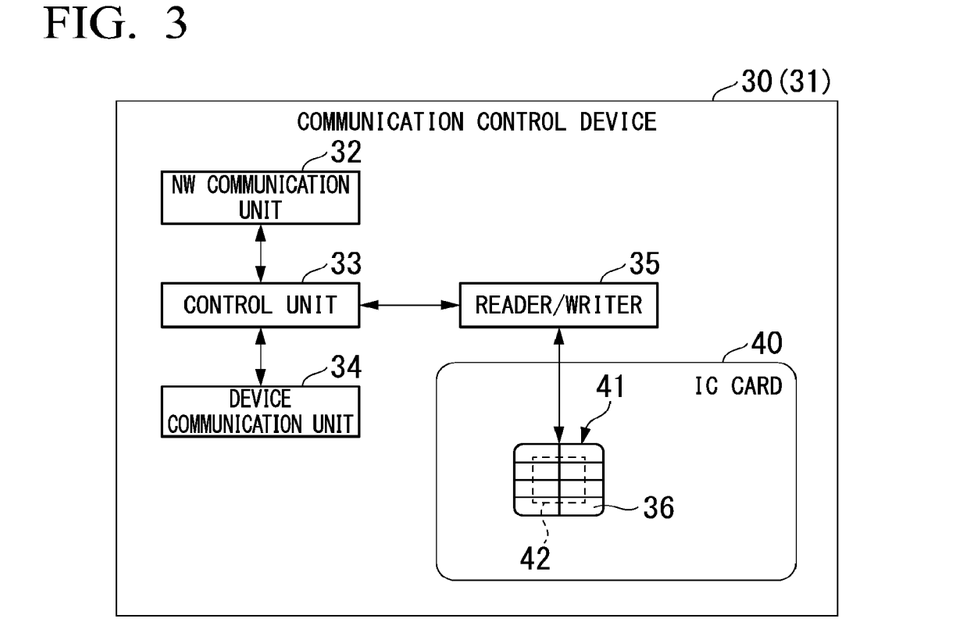
FIG. 3 is a block diagram showing an example of functional configurations of a client-side communication control device 30 and a server-side communication control device 31 according to the embodiment.

Here, the configurations of the client-side communication control device 30 and the server-side communication control device 31 will be described with reference to FIG. 3. FIG. 3 is a block diagram showing an example of functional configurations of the client-side communication control device 30 and the server-side communication control device 31 according to the embodiment. The functional configurations of the client-side communication control device 30 and the server-side communication control device 31 are the same. Thus, one configuration (for example, the configuration of the client-side communication control device 30) will be described below and the description of the other configuration (for example, the configuration of the server-side communication control device 31) will be omitted. Hereinafter, when the client-side communication control device 30 and the server-side communication control device 31 are not distinguished from each other, they are simply referred to as the communication control device 30 (31) and the like.

As shown in FIG. 3, the communication control device 30 (31) includes a network (NW) communication unit 32, a control unit 33, a device communication unit 34, a reader/writer 35, and an IC card 40.

Here, the IC card 40 is an example of an "authentication unit".

The NW communication unit 32 is connected to the network NW and communicates with the other communication control device 30 (31) via the network NW.

For example, the control unit 33 is a processor including a CPU and the like and generally controls the communication control device 30 (31). For example, the control unit 33 transmits a command to the IC card 40 via the reader/writer 35 and receives a response from the IC card 40. The control unit 33 transmits information based on the response received from the IC card 40 to the other communication control device 30 (31) via the NW communication unit 32. The control unit 33 transmits a command to the IC card 40 on the basis of the information received from the other communication control device 30 (31) via the NW communication unit 32.

The device communication unit 34 is connected to a device (the client device 10 or the server device 20) and communicates with the device. Specifically, the device communication unit 34 of the client-side communication control device 30 is connected to the client device 10, acquires imaging data from the client device 10, and outputs decrypted control data to the client device 10. The device communication unit 34 of the server-side communication control device 31 is connected to the server device 20, acquires control data from the server device 20, and outputs decrypted imaging data to the server device 20.

The reader/writer 35 performs communication with the IC card 40 via a contact unit 36 of the IC card 40.

The IC card 40 is formed, for example, by mounting an IC module 41 on a plastic card substrate. That is, the IC card 40 includes the IC module 41 and a card substrate in which the IC module 41 is embedded. The IC card 40 is attached to the communication control device 30 (31) so that the IC card 40 can be attached to or detached from the communication control device 30 (31) and can communicate with the communication control device 30 (31) via the contact unit 36.

The IC card 40 receives, for example, a command (a processing request) transmitted by the communication control device 30 (31) via the contact unit 36, and executes a process (command processing) according to the received command. Then, the IC card 40 transmits a response, which is a result of executing the command processing, (a processing response) to the communication control device 30 (31) via the contact unit 36.

The IC module 41 includes the contact unit 36 and the IC chip 42. The contact unit 36 has terminals for various types of signals necessary for the operation of the IC card 40. Here, the terminals for various types of signals include terminals for receiving a power supply voltage, a clock signal, a reset signal, and the like from the communication control device 30 (31) and serial data input and output terminals (SIO terminals) for communicating with the communication control device 30 (31). For example, the IC chip 42 is large scale integration (LSI) such as a one-chip microprocessor.

Figure 4:
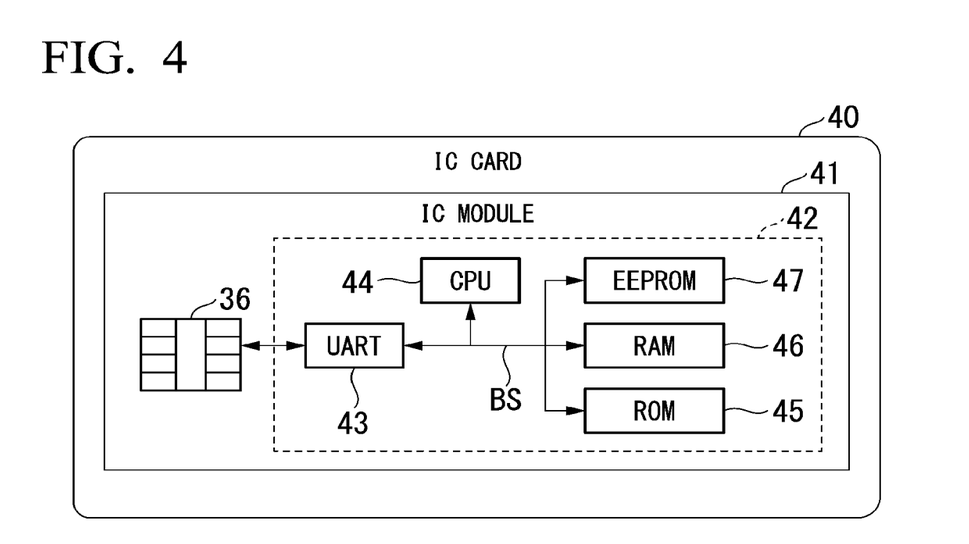
FIG. 4 is a diagram showing an example of a hardware configuration of an IC card 40 according to the embodiment.

Here, the hardware configuration of the IC card 40 will be described with reference to FIG. 4. FIG. 4 is a diagram showing an example of a hardware configuration of the IC card 40 according to the embodiment.

The IC card 40 includes the IC module 41 having the contact unit 36 and the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM) 47. The respective components (43 to 47) are connected via an internal bus BS.

The UART 43 performs serial data communication with the communication control device 30 (31) via the SIO terminal described above. The UART 43 outputs data (for example, 1-byte data) obtained by converting the serial data signal received via the SIO terminal into parallel data to the internal bus BS. The UART 43 converts data acquired via the internal bus BS into serial data and outputs the serial data to the communication control device 30 (31) via the SIO terminal. For example, the UART 43 receives a command from the communication control device 30 (31) via the SIO terminal. The UART 43 transmits a response to the communication control device 30 (31) via the SIO terminal.

The CPU 44 executes various types of processes of the TC card 40 by executing a program stored in the ROM 45 or the EEPROM 47. For example, the CPU 44 executes command processing according to the command received by the UART 43 via the contact unit 36.

For example, the ROM 45 is a non-volatile memory such as a mask ROM and stores data such as a program for executing various processes of the IC card 40 and a command table. For example, the RAM 46 is a volatile memory such as a static RAM (SRAM) and temporarily stores data used when various types of processes of the IC card 40 are performed. The EEPROM 47 is, for example, an electrically rewritable nonvolatile memory. The EEPROM 47 stores various types of data used by the IC card 40. For example, the EEPROM 47 stores information used for various types of services (applications) using the IC card 40.

Figure 5:
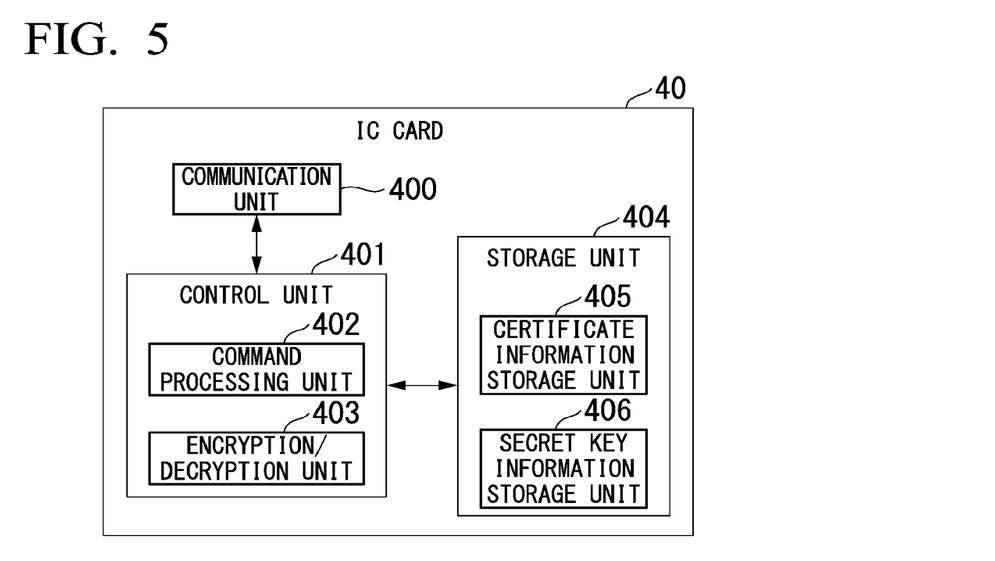
FIG. 5 is a block diagram showing an example of a functional configuration of the IC card 40 according to the embodiment.

Next, the configuration of the IC card 40 will be described with reference to FIG. 5. FIG. 5 is a block diagram showing an example of a functional configuration of the IC card 40 according to the embodiment. The IC card 40 includes a communication unit 400, a control unit 401, and a storage unit 404. Here, each part of the IC card 40 shown in FIG. 5 is implemented using the hardware of the IC card 40 shown in FIG. 4.

The communication unit 400 is implemented by, for example, the UART 43, the CPU 44, and a program stored in the ROM 45, and, for example, transmits and receives a command and a response to and from the communication control device 30 (31) via the contact unit 36. That is, the communication unit 400 receives a command (a processing request) for requesting a predetermined process from the communication control device 30 (31) and transmits a response (a processing response) to the command to the communication control device 30 (31). The communication unit 400 causes the RAM 46 to store received data received from the communication control device 30 (31) via the UART 43. The communication unit 400 transmits transmission data stored in the RAM 46 to the communication control device 30 (31) via the UART 43.

The control unit 401 is implemented by, for example, the CPU 44, the RAM 45, the ROM 46, or the EEPROM 47, and generally controls the IC card 40. The control unit 401 includes a command processing unit 402 and an encryption/decryption unit 403.

Here, a process to be performed by the command processing unit 402 is an example of a "first mutual authentication process" and a "second mutual authentication process". A process to be performed by the encryption/decryption unit 403 is an example of a "first encryption/decryption process" and a "second encryption/decryption process"

The command processing unit 402 executes various types of command processing. For example, the command processing unit 402 performs an SSL/TLS handshake as command processing for transmitting an HTTPS request to be described below. In the SSL/TLS handshake, key information necessary for encrypted communication and the like is exchanged and mutual authentication with a communication destination device is performed. Here, the mutual authentication is an authentication process in which the client-side communication control device 30 and the server-side communication control device 31 mutually check that they are devices that are properly authenticated before communication is performed.

The encryption/decryption unit 403 executes a process of encrypting data and a process of decrypting the encrypted data. The encryption/decryption unit 403 encrypts the data output by the device (the client device 10 or the server device 20) acquired via the communication unit 400. The encryption/decryption unit 403 decrypts the encrypted data from the network NW acquired via the communication unit 400.

The storage unit 404 is, for example, a storage unit having the EEPROM 47 and includes a certificate information storage unit 405 and a secret information storage unit 406. The certificate information storage unit 405 stores a certificate for a device (the client device 10 or the server device 20) issued by the communication control management device 50. Specifically, information indicating the client certificate is stored in the certificate information storage unit 405 of the IC card 40 attached to the client-side communication control device 30. Information indicating the server certificate is stored in the certificate information storage unit 405 of the IC card 40 attached to the server-side communication control device 31.

The secret information storage unit 406 stores a secret key for the device (the client device 10 or the server device 20) issued by the communication control management device 50. Specifically, information indicating the secret key issued to the client-side communication control device 30 is stored in the secret information storage unit 406 of the IC card 40 attached to the client-side communication control device 30. Information indicating the secret key issued to the server-side communication control device 31 is stored in the certificate information storage unit 405 of the IC card 40 attached to the server-side communication control device 31.

Figure 6:
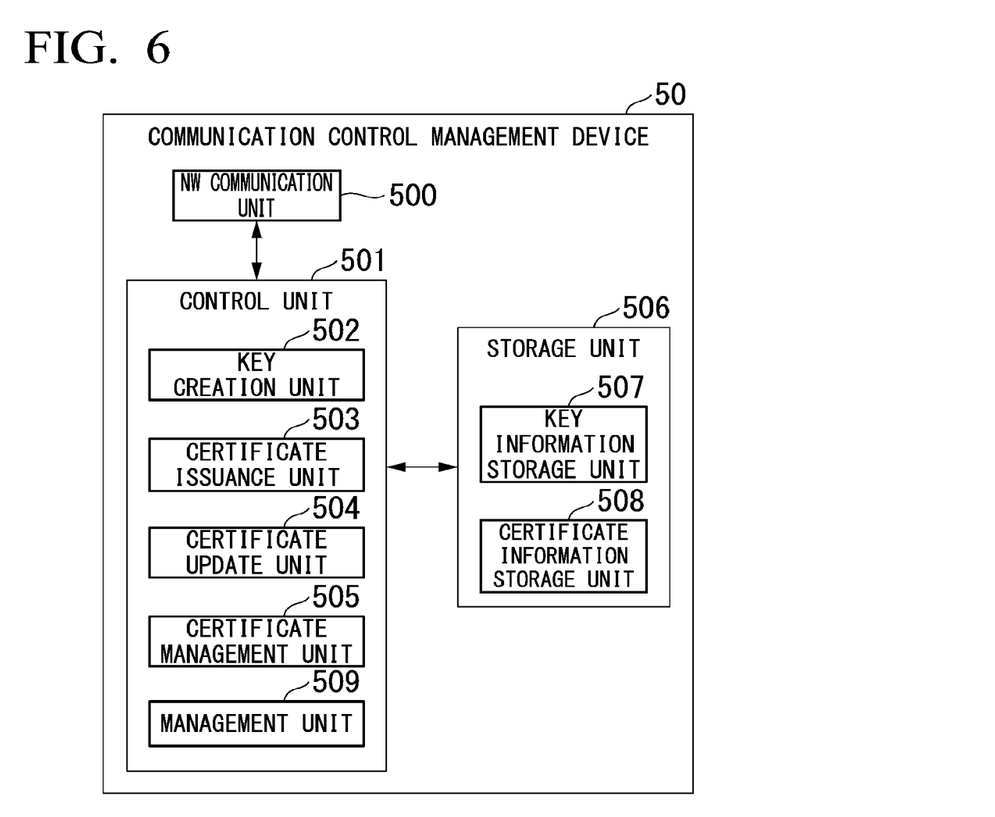
FIG. 6 is a block diagram showing an example of a functional configuration of a communication control management device 50 according to the embodiment.

Here, the configuration of the communication control management device 50 will be described with reference to FIG. 6. FIG. 6 is a block diagram showing an example of a functional configuration of the communication control management device 50 according to the embodiment. The communication control management device 50 includes, for example, a network (NW) communication unit 500, a control unit 501, and a storage unit 506.

The NW communication unit 500 is connected to the network NW and communicates with the communication control device 30 (31) via the network NW.

For example, the control unit 501 is a processor including a CPU and the like and generally controls the communication control management device 50. The control unit 501 mainly functions as a private certificate authority that recognizes the validity of the communication control device 30 (31). The control unit 501 includes a key generation unit 502, a certificate issuance unit 503, a certificate update unit 504, a certificate management unit 505, and a management unit 509.

For example, the key generation unit 502 issues a secret key corresponding to a public key included in a certificate to be described below on the basis of an authentication request from the communication control device 30 (31).

For example, the certificate issuance unit 503 issues a certificate that recognizes the validity of the communication control device 30 (31) on the basis of the authentication request from the communication control device 30 (31). The certificate includes a public key and information indicating an owner of the communication control device 30 (31).

The certificate update unit 504 updates the certificate by setting a new validity period for the certificate whose validity period has expired. The certificate update unit 504 issues, for example, a certificate in which the validity period of the certificate issued to the communication control device 30 (31) is extended on the basis of an update request from the communication control device 30 (31) and transmits the issued certificate to the communication control device 30 (31). Information indicating the issued certificate is received by the communication control device 30 (31) and stored in the certificate information storage unit 405 of the IC card 40 of the communication control device 30 (31), so that the validity period of the certificate of the communication control device 30 (31) is extended.

The certificate management unit 505 manages certificates that have already been issued. For example, the certificate management unit 505 performs a process of invalidating the certificate issued to the communication control device 30 (31) when validity in mutual authentication has not been mutually proved due to falsification, theft, or the like of the IC card 40 attached to the communication control device 30 (31). The certificate management unit 505 may be configured to respond regarding whether or not certificates issued to the communication control device 30 (31) and other communication devices have been issued by the certificate management unit 505 on the basis of an inquiry from the communication control device 30 (31). The certificate management unit 505 may be configured to periodically check whether the issued certificate is being used in the valid communication control device 30 (31).

The management unit 509 manages the communication control device 30 (31). For example, the management unit 509 remotely controls the mutual authentication to be performed by the communication control device 30 (31) via the network NW.

The storage unit 506 includes, for example, a key information storage unit 507 and a certificate information storage unit 508. For example, the key information storage unit 507 stores information indicating a public key or a secret key that has already been issued. For example, the certificate information storage unit 508 stores information indicating a certificate that has already been issued. The key information storage unit 507 and the certificate information storage unit 508 are referred to, for example, when the key generation unit 502 issues a secret key, when the certificate issuance unit 503 issues a certificate, or the like. The key information storage unit 507 stores information indicating the secret key issued by the key generation unit 502. The certificate information storage unit 508 stores information indicating the certificate issued by the certificate issuance unit 503.

Figure 7:
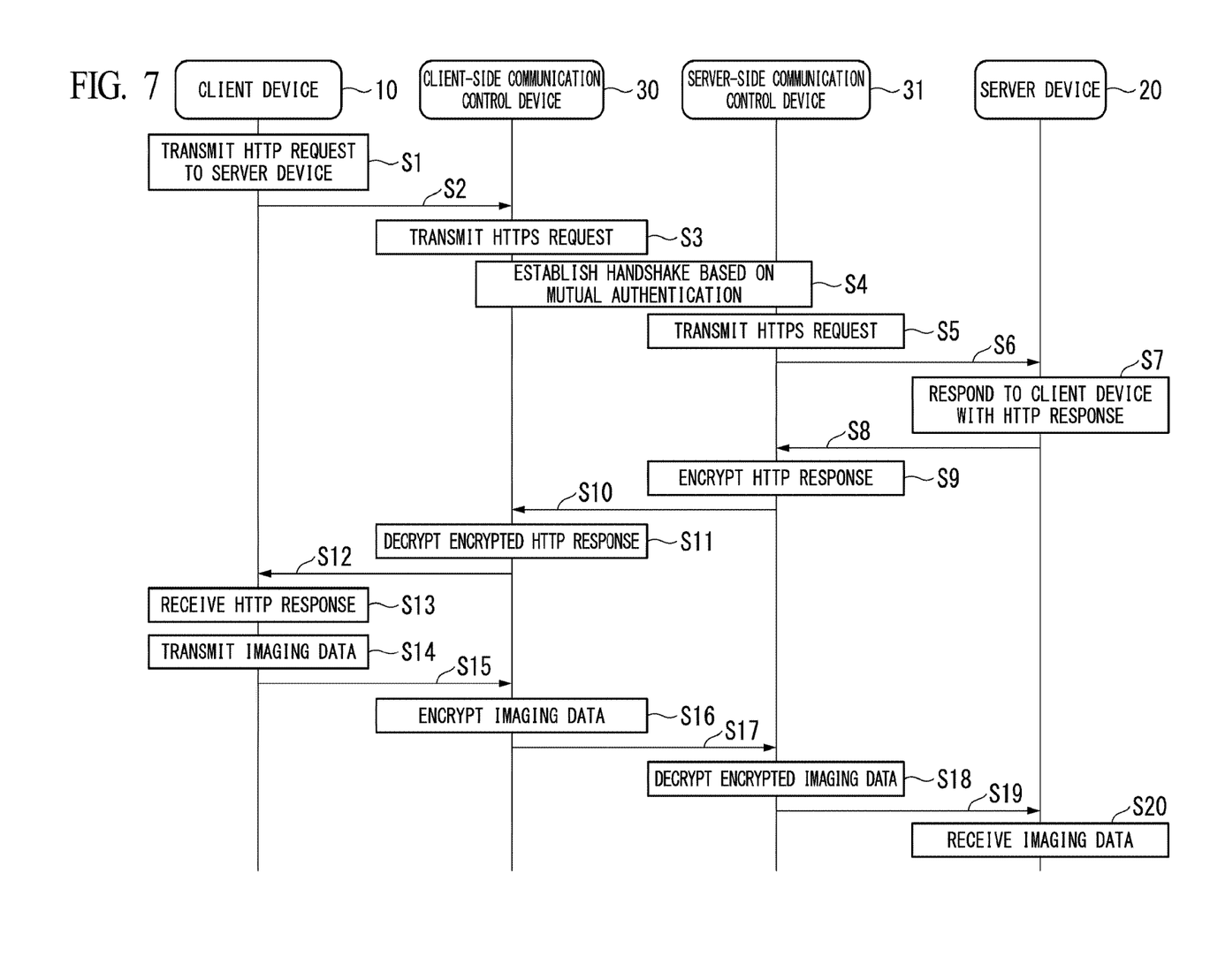
FIG. 7 is a sequence chart showing an example of a process to be performed by the communication control system 1 according to the embodiment.

Here, a flow of a process to be performed by the communication control system 1 will be described with reference to FIG. 7. FIG. 7 is a sequence chart showing an example of a process to be performed by the communication control system 1 according to the embodiment.

The client device 10 first transmits an HTTP request to the server device 20 when imaging data is transmitted to the server device 20 (step S1). The HTTP request transmitted by the client device 10 is acquired by the client-side communication control device 30 (step S2).

When the HTTP request transmitted by the client device 10 is acquired, the client-side communication control device 30 transmits an HTTPS request (ClientHello) to the server-side communication control device 31 (step S3). Thereby, a handshake is started in communication between the client-side communication control device 30 and the server-side communication control device 31 (step S4).

Specifically, ClientHello transmitted by the client-side communication control device 30 includes, for example, information indicating a TLS version and a list of encryption schemes or algorithms used for communication. The server-side communication control device 31 transmits an HTTPS response (ServerHello) to the client-side communication control device 30 as a response to ClientHello. ServerHello transmitted by the server-side communication control device 31 includes, for example, information selected by the server device 20 among options presented in ClientHello. In other words, a specific encryption algorithm in communication is determined by the server-side communication control device 31 performing selection with respect to the presentation from the client-side communication control device 30.

Then, the server-side communication control device 31 transmits information necessary for the common key for use in encrypted communication. For example, information necessary for the common key includes information indicating the public key issued to the server device 20 and its certificate and information for requesting the transmission of the public key of the client device 10 and its certificate. The client-side communication control device 30 transmits information necessary for the public key issued to its own device and its certificate and the common key for use in encrypted communication to the server-side communication control device 31.

For example, mutual authentication in communication between the client-side communication control device 30 and the server-side communication control device 31 is performed as follows. The client-side communication control device 30 generates a signature from ServerHello or the like received so far and transmits the signature to the server-side communication control device 31. The server-side communication control device 31 verifies the signature received from the client-side communication control device 30 on the basis of the certificate received from the client-side communication control device 30. If verification is successful, the server-side communication control device 31 determines that the certificate is definitely a certificate of the client-side communication control device 30. The server-side communication control device 31 generates a signature from ClientHello or the like received so far and transmits the signature to the client-side communication control device 30. The client-side communication control device 30 verifies the signature received from the server-side communication control device 31 on the basis of the certificate received from the server-side communication control device 31. If the verification is successful, the client-side communication control device 30 determines that the certificate is definitely a certificate of the server-side communication control device 31.

When mutual authentication in communication between the client-side communication control device 30 and the server-side communication control device 31 is correctly performed, each of the client-side communication control device 30 and the server-side communication control device 31 generates and exchanges a common key for use in encryption.

Thereby, the handshake is established in communication between the client-side communication control device 30 and the server-side communication control device 31.

When the handshake with the client-side communication control device 30 is established, the server-side communication control device 31 transmits an HTTP request to the server device 20 (step S5). The HTTP request is an HTTP request transmitted from the client device 10 in step S1.

The HTTP request transmitted by the server-side communication control device 31 is received by the server device 20 (step S6). At this time, the server device 20 recognizes that an HTTP request has been transmitted from the client device 10. Thus, the server device 20 responds to the client device 10 with an HTTP response (step S7). An HTTP response transmitted by the server device 20 is acquired by the server-side communication control device 31 (step S8).

The server-side communication control device 31 encrypts the acquired HTTP response from the server device 20 using the common key determined in the handshake in step S4 (step S9). The HTTP response encrypted by the server-side communication control device 31 is received by the client-side communication control device 30 via the network NW (step S10). The client-side communication control device 30 decrypts the received HTTP response using the common key (step S11). The HTTP response decrypted by the client-side communication control device 30 is acquired by the client device 10 (step S12). The client device 10 receives the decrypted HTTP response (step S13). At this time, the client device 10 recognizes that an HTTP response has been transmitted from the server device 20. Thus, the client device 10 transmits imaging data to the server device 20 (step S14).

The imaging data transmitted by the client device 10 is acquired by the client-side communication control device 30 (step S15). The client-side communication control device 30 encrypts the imaging data transmitted by the client device 10 using a common key (step S16). The imaging data encrypted by the client-side communication control device 30 is received by the server-side communication control device 31 via the network NW (step S17).

The server-side communication control device 31 decrypts the received imaging data using the common key (step S18). The imaging data decrypted by the server-side communication control device 31 is acquired by the server device 20 (step S19). The server device 20 receives the decrypted imaging data (step S20). At this time, the server device 20 recognizes that the imaging data from the client device 10 has been received.

When the mutual authentication in the communication between the client-side communication control device 30 and the server-side communication control device 31 has not been correctly performed in step S4 of the above-described flowchart, the client-side communication control device 30 does not permit communication with the communication destination. Specifically, the client-side communication control device 30 does not output the information transmitted from the communication destination to the client device 10. This is because, when the mutual authentication has not been correctly performed, there is a possibility that the communication destination will be an unauthorized communication device pretending to be the server-side communication control device 31. In this case, for example, the client-side communication control device 30 may be configured to transmit a communication record when the mutual authentication has not been correctly performed to the communication control management device 50. Accordingly, the communication control management device 50 can acquire a communication record when the mutual authentication has not been correctly performed, and monitor abnormalities of a network by ascertaining a pattern or frequency of unauthorized communication with the client-side communication control device 30 under management.

The client-side communication control device 30 may be configured to determine whether or not to permit communication with the communication destination on the basis of a transmission destination list indicating information of communication equipment with which the client device 10 is permitted to perform communication instead of mutual authentication in the handshake performed in step S4 of the above-described flowchart. The communication device information shown in the transmission destination list is, for example, a uniform resource locator (URL). The control unit 33 of the client-side communication control device 30 permits communication with the communication destination when the URL of the communication destination is a URL registered in the transmission destination list and does not permit communication when the URL of the communication destination is not registered in the transmission destination list.

The control unit 33 may be configured to update the transmission destination list. For example, the control unit 33 causes a URL of a communication destination permitted to communicate with the client device 10 for a fixed period and a URL of a communication destination which is not permitted to communicate with the client device 10 to be stored. Then, for example, the control unit 33 updates the transmission destination list by re-registering a URL of a communication destination with which communication has been performed for a fixed period among the URLs registered in the transmission destination list and the like. Alternatively, the client-side communication control device 30 may be configured to transmit a communication destination URL for which communication is permitted for a fixed period and a communication destination URL for which no communication is permitted to the communication control management device 50. In this case, for example, the communication control management device 50 may be configured to update the transmission destination list on the basis of the communication destination URL that communicates with the client-side communication control device 30. By updating the transmission destination list in the communication control management device 50, communication equipment that communicates with the client-side communication control device 30 under the management of the communication control management device 50 can be collectively managed.

The client-side communication control device 30 may be configured to verify whether or not details of information (for example, an update program of firmware) transmitted to the client device 10 after the handshake performed in step S4 is established are correct. For example, when the update program of firmware of the client device 10 has been transmitted via the network NW, the control unit 33 of the client-side communication control device 30 performs verification using a verification key. In this case, for example, the communication control management device 50 may be configured to transmit the verification key to each of the client-side communication control device 30 and the server-side communication control device 31.

For example, the server-side communication control device 31 generates a hash value from information (plaintext) that is transmitted to the client device 10 and encrypts the generated hash value with a verification key. Then, the server-side communication control device 31 further encrypts the plaintext and the encrypted hash value with a secret key and transmits an encryption result to the client device 10. The client-side communication control device 30 decrypts information using the common key and acquires the plaintext and the encrypted hash value.

The client-side communication control device 30 generates a hash value from the acquired plaintext and decrypts the encrypted hash value with the verification key. When the hash value generated from the plaintext and the decrypted hash value are equal, the client-side communication control device 30 determines that the information transmitted to the client device 10 is correct details. In this case, the client-side communication control device 30 outputs the decrypted information (plaintext) to the client device 10. On the other hand, when the hash value generated from the plaintext and the decrypted hash value are not equal, the client-side communication control device 30 determines that there is a possibility that information transmitted to the client device 10 can be unauthorized information transmitted from an unauthorized communication device pretending to be the server device 20 or the server-side communication control device 31. In this case, the client-side communication control device 30 does not output the decrypted information (plaintext) to the client device 10.

Thereby, the client device 10 can receive only information verified to be verified correct details. Normally, the client device 10 generally determines whether or not details of the update program are correct when the firmware is updated. Thus, when the firmware is updated, the burden of the client device 10 may increase. On the other hand, in the communication control system 1 of the embodiment, the server-side communication control device 31 verifies details of the information transmitted to the client device 10 instead of the client device 10. Thereby, the processing load of the client device 10 can be reduced.

As described above, the communication control system 1 of the embodiment includes the client-side communication control device 30 connected to the client device 10 and the network NW and the server-side communication control device 31 connected to the server device 20 and the network NW. The client-side communication control device 30 includes an IC card 40 and a control unit 33. The control unit 33 requests the IC card 40 to perform at least one of a mutual authentication process and an encryption/decryption process, transmits encrypted information to the server-side communication control device 31, and transmits decrypted information to the client device 10. The server-side communication control device 31 includes an IC card 40 and a control unit 33. The control unit 33 requests the IC card 40 to perform at least one of a mutual authentication process and an encryption/decryption process, transmits encrypted information to the client-side communication control device 30, and transmits decrypted information to the server device 20. In this case, the control unit 33 of the communication control device 30 (31) may cause the IC card 40 to perform only the mutual authentication process, perform only the encryption/decryption processing, or perform both the mutual authentication process and the encryption/decryption process.

Thereby, the communication control system 1 of the embodiment can improve the security of the social infrastructure system without changing the social infrastructure system. This is because imaging data (so-called plaintext) of an HTTP protocol transmitted from the client device 10 to the server device 20 is combined with, for example, the SSL/TLS protocol, by the client-side communication control device 30 and is replaced with imaging data of HTTPS in which security is improved. Because the control data transmitted by the server device 20 to the client device 10 is encrypted, but is decrypted by the client-side communication control device 30 and received by the client device 10, it is unnecessary to cause the client device 10 to perform a decryption process and an existing device can be used as it is without any change.

In the communication control system 1 of the embodiment, because the client-side communication control device 30 and the server-side communication control device 31 perform mutual authentication, security can be improved as compared with a case in which authentication is performed only in one direction. Because an unspecified number of client terminals communicate with the server terminal in general client and server terminals, it is not realistic to issue and continuously manage valid client certificates with respect to an unspecified number of client terminals. However, in the social infrastructure system, a relationship between the client device 10 and the server device 20 is clearly identified. Thus, the client-side communication control device 30 and the server-side communication control device 31 can perform mutual authentication and can improve security.

In the case of a client terminal that does not have a client certificate, an ID and a password issued by the server terminal are required to be input for communicating with the server terminal. In such password authentication, a long-text string in which characters and numbers are combined may be required with respect to the password, or periodic password changes and the like may be required, to maintain security. However, when the number of passwords to be remembered increases, management may become troublesome and passwords may leak in a case in which passwords are left in memos or are recorded in a web browser or the like.

On the other hand, in the communication control system 1 of the embodiment, the client-side communication control device 30 has a client certificate, so that mutual authentication can be reliably performed in communication with the server device 20. Thus, password authentication becomes unnecessary. Thus, the effort and time for inputting a password and periodically changing and managing the password are eliminated and user convenience is improved. That is, security can be maintained without imposing a burden on the user.

When a client terminal that does not have a client certificate communicates with a server terminal on the basis of authentication of an ID or a password, anyone can communicate with the server terminal if the ID and the password can be correctly input. Thus, it is possible to illegally hijack the client terminal and have unauthorized access to the server terminal. Thus, for example, there is a possibility that the function of the client terminal will be limited by the server terminal that has been illegally hijacked and that the terminal will be infected with ransomware for requesting a ransom for release.

On the other hand, in the communication control system 1 of the embodiment, the mutual authentication via the communication control device 30 (31) is performed in the communication between the client device 10 and the server device 20, so that the client device 10 and the server device 20 are not hijacked illegally. That is, in the communication control system 1 of the embodiment, a countermeasure against ransomware is also possible.

For example, when there is a terminal (also called a stray device) for which there is no manager within the network, the terminal may be used as an unauthorized terminal that performs an attack of malware or the like due to the unauthorized hijacking of the terminal. On the other hand, in the communication control system 1 of the embodiment, mutual authentication via the communication control device 30 (31) is performed in communication between the client device 10 and the server device 20. Thereby, even when a terminal for which there is no manager inside the network NW has been illegally hijacked and used in an attack, it is possible to prevent infection with malware or the like.

In the communication control system 1 of the embodiment, the server device 20 is connected to the server-side communication control device 31 and no authentication process is performed inside the server device 20. Thus, it is not necessary to hold a certificate or the like inside the server device 20 and it becomes clear that the server device 20 connected to the server-side communication control device 31 is under the management of the communication control management device 50. However, when the server device 20 already has a functional unit corresponding to the server-side communication control device 31, the server-side communication control device 31 is not necessarily required to be physically connected to the server device 20 and the network NW. In this case, an authentication process is performed in communication with the client-side communication control device 30 by a functional unit corresponding to the server-side communication control device 31 originally provided in the server device 20.

In the communication control system 1 of the embodiment, the control unit 401 of the IC card 40 causes at least one of a mutual authentication process and an encryption/decryption process to be performed. Thus, the device cost of the communication control device 30 (31) can be reduced.

Although an example in which the IC card 40 attached to the communication control device 30 (31) performs at least one of a mutual authentication process and an encryption/decryption process in the communication control system 1 of the embodiment has been described, the functional unit for performing the process is not limited to the IC card. It is only necessary to use a functional unit having a storage function for storing a secret key and a client certificate (or a server certificate) and a processing function for performing at least one of a mutual authentication process and an encryption/decryption process as the IC card 40 according to the embodiment. For example, the IC card 40 may be a SIM card equipped with an IC chip.

In the communication control system 1 of the embodiment, the IC card 40 of the client-side communication control device 30 is attached to the client-side communication control device 30 so that the IC card 40 of the client-side communication control device 30 can be attached to or detached from the client-side communication control device 30. Thereby, in the communication control system 1 of the embodiment, because the IC card 40 and the client-side communication control device 30 can be separated, it is only necessary to replace one device when either one is replaced. For example, when the IC card 40 and the client-side communication control device 30 are integrated, the entire client-side communication control device 30 must be replaced when a part corresponding to the IC card 40 is replaced. However, as compared with this case, in the communication control system 1 according to the embodiment, it is possible to reduce the maintenance cost when a specific part such as the IC card 40 included in the client-side communication control device 30 is replaced.

In the communication control system 1 of the embodiment, the communication control management device 50 transmits a secret key and a client certificate stored in the IC card 40 attached to the communication control device 30 (31) to the communication control device 30 (31). Thereby, the communication control system 1 according to the embodiment can perform a handshake using a valid secret key and a certificate issued by the communication control management device 50 and determine a common key and can further improve the security of the social infrastructure system in addition to the above-described effects.

Although the communication control system 1 of the embodiment has been described above, the configuration of the embodiment is not limited to the above example. For example, the communication control device 30 (31) may use a hardware security module (HSM) for implementing the function of the communication control device 30 (31) by hardware on the basis of the processing load.

In the communication control system 1 of the embodiment, secure communication using the SSL/TLS protocol may be performed all the time or whether to perform communication using the SSL/TLS protocol may be selectable. Only the communication in one direction in the two-way communication in the communication between the client device 10 and the server device 20 may be set as communication using the SSL/TLS protocol. Secure communication using the SSL/TLS protocol may be performed all the time or whether or not to perform communication using the SSL/TLS protocol may be selectable.

By performing communication using the SSL/TLS protocol all the time, communication from a device different from the valid communication control device 30 (31) authenticated by the communication control device 30 (31) can be blocked. Thus, it is possible to prevent unauthorized access to the client device 10 and the server device 20 and infection of the client device 10 or the server device 20 with malware.

In the communication control system 1 of the embodiment, communication using the SSL/TLS protocol may be performed all the time and unauthorized access to the client device 10 and the server device 20 may be stored. In this case, a record of unauthorized access may be transmitted to the communication control management device 50. The communication control management device 50 can recognize the presence or absence of unauthorized access and can detect a sign stage and take a measure before a large-scale attack on the entire system is started.

In the communication control system 1 of the embodiment, the communication control device 30 (31) may periodically check whether or not a connection with the client device 10 or the server device 20 to which its own device is connected is maintained. In this case, information indicating a connection state may be transmitted to the communication control management device 50. In a case in which the information indicating the connection state cannot be received from the communication control device 30 (31) and the like, the communication control management device 50 determines that the communication control device 30 (31) is disconnected from the client device 10 or the server device 20 and invalidates the disconnected communication control device 30 (31). Accordingly, the communication control management device 50 prevents the disconnected communication control device 30 (31) from being connected to an unauthorized device and misused for evil purposes.

In the communication control system 1 of the embodiment, a chip with high tamper resistance called a secure element acquiring CC (common criteria/ISO 15408) authentication may be mounted on the IC card 40 attached to the communication control device 30 (31). By using this chip to store a certificate including a secret key and a public key, very high security can be maintained.

In the communication control system 1 of the embodiment, the program of the client device 10 may be configured to be updated from the server device 20, the communication control management device 50, or the like via the communication control device 30 (31). It is possible to securely update the function of the client device 10 by performing the update of a program (the update of firmware) via the communication control device 30 (31). When the firmware is transmitted from the server device 20 to the client device 10 as described above, for example, a signature of the server device 200 encrypted by the server-side communication control device 31 is assigned to the firmware transmitted from the server device 20. In this case, the client device 10 can determine that the transmitted firmware is definitely the firmware transmitted from the server device 20 by decrypting the signature by means of the client-side communication control device 30. Thereby, even if unauthorized firmware is transmitted from an unauthorized terminal that pretends to be the server device 20 to the client device 10, it is possible to eliminate erroneous update based on illegal firmware with respect to the client device 10.

As described above, by performing communication via the communication control device 30 (31), the firmware can be securely updated from the server device 20, the communication control management device 50, or the like to the client device 10. Thus, work cost can be reduced as compared with a case in which a worker physically moves to a place where each client device 10 is installed with respect to a plurality of client devices 10 and performs a firmware update operation.

In the communication control system 1 of the embodiment, the client device 10 may be started or stopped from the server device 20, the communication control management device 50, or the like via the communication control device 30 (31). By performing the start and stop (remote activation) via the communication control device 30 (31), the function of the client device 10 can be updated securely and secure remote control can be implemented.

Although an example in which the client device 10 and the server device 20 communicate by wire in the communication control system 1 of the embodiment has been described, the present invention is not limited thereto. At least one of the client device 10 and the server device 20 may be a device that performs wireless communication via a wireless LAN or the like. For example, when the client device 10 communicates with the server device 20 according to wireless communication, the client-side communication control device 30 has a wireless communication function, encrypts data transmitted by the client device 10, and transmits the encrypted data to the server device 20 according to wireless communication.

Although an example in which the client-side communication control device 30 communicates with the server-side communication control device 31 in the communication control system 1 of the above-described embodiment has been described, the communication destination of the client-side communication control device 30 is not limited thereto. For example, the client-side communication control device 30-1 may communicate with the client-side communication control device 30-2. When a communication start signal has been received from the client-side communication control device 30-2, the client-side communication control device 30-1 first performs mutual authentication in communication with the client-side communication control device 30-2 and checks that the client-side communication control device 30-2 is a valid communication terminal. When the mutual authentication has been correctly performed, the client-side communication control device 30-1 outputs information received from the client-side communication control device 30-2 to the client device 10. By attaching an authenticator to transmission data using encryption, it becomes possible to detect tampering of communication information and identify a transmitter. Thus, in the communication control system 1 of the present embodiment, a process of "receiving data that has not been tampered" "from a correct communication partner" can be reliably performed in communication between the client-side communication control device 30 and the server-side communication control device 31 and communication between the client-side communication control devices 30.

While several embodiments of the present invention have been described, these embodiments have been presented by way of example and are not intended to limit the scope of the invention. These novel embodiments can be implemented in various other forms, and various omissions, substitutions, and modifications can be made without departing from the spirit of the invention. These embodiments and modifications thereof are included in the scope and spirit of the invention and are included in the invention described in the claims and the equivalent scope thereof.

REFERENCE SIGNS LIST

1 Communication control system
10 Client device
20 Server device
30 Client-side communication control device
31 Server-side communication control device
40 IC card
402 Command processing unit 403 Encryption/decryption unit
405 Certificate information storage unit
406 Secret information storage unit.

The invention claimed is:

1. A communication control system comprising:
a first communication control device connected to a client device and a network communication grid; and
a second communication control device connected to a server device and the network communication grid,
wherein the first communication control device comprises
a first authentication unit; and
a first processor that is configured to execute instructions to request the first authentication unit to perform at least one of a mutual authentication process and an encryption/decryption process, the mutual authentication process performing mutual authentication in communication with the second communication control device using a secret key and a client certificate issued by a private authentication authority, the encryption/decryption process encrypting information, that is transmitted to the server device by the client device using a common key determined for communication between the first communication control device and the second communication control device, and the encryption/decryption process decrypting information, that is transmitted to the client device by the server device, using the common key, and
wherein the second communication control device comprises:
a second authentication unit; and
a second processor that is configured to execute instructions to request the second authentication unit to perform at least one of a mutual authentication process and an encryption/decryption process, the mutual authentication process performing mutual authentication in communication with the first communication control device, using a secret key and a server certificate issued by the private authentication authority, the encryption/decryption process encrypting information, that is transmitted to the client device by the server device, using the common key, and the encryption/decryption process decrypting information, that is transmitted to the server device by the client device, using the common key.

2. The communication control system according to claim 1, wherein the first authentication unit is attached to the first communication control device so that the first authentication unit attachable to or detachable from the first communication control device.

3. The communication control system according to claim 1, further comprising the private authentication authority,
wherein the private authentication authority transmits the secret key and the client certificate to be stored in the first authentication unit to the first communication control device and transmits the secret key and the server certificate to be stored in the second authentication unit to the second communication control device.

4. The communication control system according to claim 3,
wherein the private authentication authority further comprises a certificate update unit configured to update the client certificate on the basis of a validity period of the client certificate, and
wherein the private authentication authority transmits the client certificate updated by the certificate update unit to the first communication control device.

5. The communication control system according to claim 3, wherein the private authentication authority further comprises a management unit configured to invalidate the client certificate when validity has not been mutually proved in the mutual authentication process of the first communication control device.

6. The communication control system according to claim 1, wherein the first processor executes the instructions to request the first authentication unit to perform the mutual authentication in communication with a communication device transmitting information to the client device, determine whether or not to permit communication with the client device for the communication device on the basis of a result of the mutual authentication, and transmit a determination result to the private authentication authority.

7. The communication control system according to claim 1, wherein the first processor executes the instructions to request the first authentication unit to perform a firmware verification process of performing verification of whether or not details of information about firmware of the client device transmitted to the client device are correct using a key issued by the private authentication authority.

8. The communication control system according to claim 1, wherein the first authentication unit determines whether or not to permit communication with the client device for a communication device transmitting information to the client device on the basis of a transmission destination list indicating information about communication equipment for which communication with the client device is permitted.

9. The communication control system according to claim 1, wherein the first communication control device determines whether or not a connection with the client device is being maintained at a predetermined timing.

10. A client-side communication control device connectable to a gateway and a client device, the gateway being provided between the client device and a network communication grid, the client-side communication control device comprising:
an authentication unit; and
a processor that is configured to execute instructions to request the authentication unit to perform at least a mutual authentication process among the mutual authentication process and an encryption/decryption process, the mutual authentication process performing mutual authentication in communication with a server-side communication control device using a client secret key and a client certificate, the client secret key and the client certificate being issued by a private authentication authority provided separately from a server device, transmitted to the client-side communication control device by the private authentication authority, and stored in the authentication unit, the private authentication authority transmitting to the server-side communication control device a server secret key and a server certificate to be used for the server device, the server device being a communication destination of the client device, the server-side communication control device being connected to the server device and the network communication grid, the encryption/decryption process encrypting information, that is transmitted to the server device by the client device, using a common key determined for communication between the client-side communication control device and the server-side communication control device, the encryption/decryption process decrypting information, that is transmitted to the client device by the server device, using the common key, wherein the client-side communication control device communicates with the client device in plaintext by wire and communicates with the gateway by wire.

11. The client-side communication control device according to claim 10, wherein the processor executes the instructions to request the authentication unit to perform the mutual authentication in communication with a communication device transmitting information to the client device, determine whether or not to permit communication with the client device for the communication device on the basis of a result of the mutual authentication, and transmit a determination result to the private authentication authority.

12. The client-side communication control device according to claim 10, wherein the processor executes the instructions to request the authentication unit to perform a firmware verification process of performing verification of whether or not details of information about firmware of the client device transmitted to the client device are correct using a key issued by the private authentication authority.

13. The client-side communication control device according to claim 10, wherein the authentication unit determines whether or not to permit communication with the client device for a communication device transmitting information to the client device on the basis of a transmission destination list indicating information about communication equipment for which communication with the client device is permitted.

14. The client-side communication control device according to claim 10, wherein the client-side communication control device receives from the private authentication authority the client certificate updated on the basis of a validity period.

15. The client-side communication control device according claim 10, wherein the client certificate is invalidated by the private authentication authority when validity has not been mutually proved in the mutual authentication process of the client-side communication control device.

* * * * *